US010591337B1

(12) United States Patent
Neuhalfen et al.

(10) Patent No.: US 10,591,337 B1
(45) Date of Patent: Mar. 17, 2020

(54) DISPENSING CUP FOR AEROSOL DEVICE

(71) Applicant: AptarGroup, Inc., Cary, IL (US)

(72) Inventors: Mark Neuhalfen, Mount Prospect, IL (US); Gregory A Erickson, Wheaton, IL (US); Stephen Virgilio, Mount Prospect, IL (US); Paul Hallman, Village of Lakewood, IL (US); Gerald J Marquardt, Elgin, IL (US); Sean Hang Cho, Elgin, IL (US)

(73) Assignee: AptarGroup, Inc., Cary, IL (US)

( * ) Notice: Subject to any disclaimer, the term of this patent is extended or adjusted under 35 U.S.C. 154(b) by 0 days.

(21) Appl. No.: 14/714,151

(22) Filed: May 15, 2015

Related U.S. Application Data

(60) Provisional application No. 61/994,724, filed on May 16, 2014.

(51) Int. Cl.
  *G01F 11/26* (2006.01)
  *B65D 83/40* (2006.01)
  *B65D 83/14* (2006.01)

(52) U.S. Cl.
  CPC ............ *G01F 11/263* (2013.01); *B65D 83/40* (2013.01); *B65D 83/75* (2013.01)

(58) Field of Classification Search
  CPC ........ G01F 11/263; B65D 83/40; B65D 83/75
  USPC ................. 222/402.11, 402.12, 182, 402.21; 141/380
  See application file for complete search history.

(56) References Cited

U.S. PATENT DOCUMENTS

| | | | |
|---|---|---|---|
| 2,214,714 A | 9/1940 | Bates | |
| 2,722,224 A | 11/1955 | Biann | |
| 3,168,059 A * | 2/1965 | Germann | A23G 3/0257 114/67 A |
| 3,203,454 A * | 8/1965 | Micallef | B65D 83/28 141/113 |
| 3,228,567 A * | 1/1966 | Abplanalp | B65D 83/28 222/157 |
| 4,143,794 A | 3/1979 | Stratford et al. | |
| 4,212,332 A | 7/1980 | Kutik et al. | |
| 4,420,099 A * | 12/1983 | Pizzurro | B65D 83/30 222/182 |
| 5,054,656 A | 10/1991 | Lasner | |
| 5,127,553 A | 7/1992 | Weinstein | |
| 5,224,632 A | 7/1993 | Murakami et al. | |
| 5,261,569 A | 11/1993 | Sandwell | |
| 5,381,930 A | 1/1995 | Kalabakas | |
| 6,021,927 A * | 2/2000 | Nomiyama | B65D 83/24 222/182 |
| 6,186,367 B1 | 2/2001 | Harrold | |

(Continued)

*Primary Examiner* — Donnell A Long
(74) *Attorney, Agent, or Firm* — Frijouf, Rust & Pyle, P.A.

(57) ABSTRACT

A lockable metering aerosol dispenser is disclosed for dispensing an aerosol product from an aerosol container through an aerosol valve. The lockable metering aerosol dispenser comprises a base secured to the aerosol container with a cup rotationally mounted to the base between a locked rotational position and an unlocked rotational position. A metering cup is secured relative to the base and communicates with the aerosol valve. The cup is capable of actuating the aerosol valve for dispensing the aerosol product into the metering cup when the cup is rotated into the unlocked rotational position. The cup is inhibited from actuating the aerosol valve when the cup is rotated into the locked rotational position.

10 Claims, 14 Drawing Sheets

(56) References Cited

U.S. PATENT DOCUMENTS

| | | |
|---|---|---|
| 6,253,967 B1 | 7/2001 | Speerna Weiland |
| 6,330,960 B1 | 12/2001 | Faughey et al. |
| 7,097,071 B2 | 8/2006 | Anderson et al. |
| 2008/0308183 A1* | 12/2008 | Law ................. B65D 41/26 141/380 |
| 2010/0224345 A1* | 9/2010 | Lyda .................. B65D 83/205 165/104.19 |
| 2011/0284578 A1 | 11/2011 | Wong |

* cited by examiner

DISPENSING CUP FOR AEROSOL DEVICE

CROSS-REFERENCE TO RELATED APPLICATIONS

This application claims benefit of U.S. Patent Provisional application No. 61/994,724 filed May 16, 2015. All subject matter set forth in provisional application No. 61/994,724 filed May 16, 2015 is hereby incorporated by reference into the present application as if fully set forth herein.

BACKGROUND OF THE INVENTION

Field of the Invention

This invention relates to dispensing and more particularly to an improved dispensing cup for receiving aerosol product from an aerosol device.

Description of the Related Art

An aerosol dispenser comprises an aerosol product and an aerosol propellant contained within an aerosol container. An aerosol valve is provided to control the discharge of the aerosol product from the aerosol container through the fluid pressure provided by the aerosol propellant. The aerosol valve is biased into a closed position. A valve stem cooperates with the aerosol valve for opening the aerosol valve. An actuator engages with the valve stem to open the aerosol valve for dispensing the aerosol product from the aerosol container.

Some aerosol dispensers incorporate a dispensing vessel receiving the aerosol product from the aerosol container for subsequent dispensing thereafter from the dispensing vessel. The following US Patents are examples of the aerosol devices of the prior art.

U.S. Pat. No. 2,214,714 to Bates discloses a device adapted to be placed on a container of liquids. The device comprises a stationary piston element, a cylinder element reciprocal thereon with a conduit extending from the cylinder into the liquid container. An air valve is unseated by the top end of the conduit when the cylinder is depressed. A conduit overflow sleeve on the piston element determines the amount of liquid-charge. An internal sleeve carried by the cylinder reciprocal between the conduit and the overflow sleeve has an opening above into the cylinder. A drain opening extends from the sleeve into the conduit, and a passage from the lower part of the cylinder extends to a point of liquid discharge outside the device. A resilient synthetic resin split ring packing provides a seal between the piston element and the cylinder while a spring provides the means to raise the cylinder.

U.S. Pat. No. 2,722,224 to Blann discloses a dispenser for fingernail treating liquid comprising a closed vessel containing fingernail treating liquid. A valve is carried by the vessel and extends into the top of the vessel. An actuating pad is carried by the valve for opening the valve when pressure is applied to advance it toward the vessel. A spray nozzle is carried by the vessel and is operatively connected to the valve for directing spray of liquid across the top of the vessel and onto the nail of a finger pressing on the pad.

U.S. Pat. No. 3,203,454 to Micallef discloses a measuring cup for pressurized containers having a downwardly movable discharge valve operating member in an end wall. A tubular sleeve extends downwardly from the bottom wall of the cup. The bottom end of the sleeve is shaped to engage the valve operating member and surrounds the discharge opening of the container. The tubular sleeve extends above the bottom of the cup. Discharge passages are in the wall of the sleeve adjacent to the inner face of the bottom wall of the cup. A closure for the end of the sleeve has a flange extending substantially beyond the wall of the sleeve and has at its outer edge an unbroken flat surface contacting the bottom wall of the cup. An annular groove is within the flat surface and the discharge passages in the sleeve opens into the groove.

U.S. Pat. No. 3,228,567 to Abplanalp discloses a device for dispensing liquid from an aerosol container having a tubular valve stem extending outwardly through an opening in the container. The device comprises a hollow holder for immovably supporting and extending outwardly from the container. A receptacle is positioned within the holder provides at its bottom a socket to receive the valve stem of the container. A passage exists between the socket and the interior of the receptacle. The receptacle is movable within the holder to enable depression of the valve stem for the purpose of delivering liquid from the container into the receptacle.

U.S. Pat. No. 3,456,567 to Mattes, et al. discloses a dispensing cap device for a pressurized can of lubricant material particularly adapted for applying lubricant to the tip of an absorbent tampon. The can is of the type which includes an axially disposed dispensing tube projecting through the top closure of the can. The tube has a central discharge opening therein controlled by a depressible valve disposed within the can. The top closure of the can has an annular bead for seating the cap. The cap comprises a hollow outer member, a cover for the outer member and an inner member disposed within the outer member in a vertical slidable relationship. The lower portion of the outer member is provided with a means to engage and hold the cap on the bead. The inner member has a shell like structure having formed a cylindrical cup of a size adapted to receive the end of a tampon body. The bottom wall of the cup is penetrated by an axially extending aperture. The upper surface of the bottom wall has spaced grooves extending radially outward from the aperture. The lower surface of the bottom wall has an axially disposed socket in which the aperture is centered and which is adapted to engage the dispensing tube and permits vertical movement of the inner member within the outer member while restricting rotational movement.

U.S. Pat. No. 4,143,794 to Stratford, et al. discloses a dosing device for fluid which comprises a dip tube extension situated within a dosage cup. The extension is constructed to enable fluid to pass from within the extension into the dosage cup and a dosage determining sleeve slidably engaging a side wall of the extension and movable relative to the extension between positions enabling retention within the cup of a selected dosage volume of fluid and return of any excess fluid into said extension.

U.S. Pat. No. 4,212,332 to Kutik, et al. discloses a present pump having a manually operated cup frictionally coupled to a floating valve to dispense liquid or other fluent product from a container. The floating valve coacts with the cup and the pump housing to control: (1) the inlet flow of product from a dip tube in the container up into the pump; (2) the outlet flow of product from the pump to a discharge spout; and (3) the connection of an air vent opening to the inside of the container at the top at the proper time in each pumping cycle. The pump housing has a circular recess on the bottom for a snap fit on a complementary support bead, such as on the top lid of the container itself. A discharge selector valve on the discharge spout enables the selection of either a droplet spray discharge or a continuous flowing stream discharge from the pump. The pump cup carries an end cap which may be removed for use as a scrub brush. The pump housing has a removable end cap with a depending rib which coacts with the cup to determine the volumetric capacity of the pump. The pump may be assembled to a measuring cup adapted to be mounted on top of the product container.

U.S. Pat. No. 4,420,099 to Pizzurro, et al. discloses a cup-shaped, doubled-walled cup for a pressurized aerosol dispenser for the dispensing of a foam product as a wad or pad including providing a venting path through the cup-shaped surface of the cup, through the space defined by the cup-shaped surface and an outer cylindrical wall and beneath the outer wall to the outside of the container when the cup is mounted in position on the container. An inner cylindrical wall suitable for affixing the cup to the outside of the bead formed by the mouth of the container and the mounting cup resiliently urges the cup toward valve closure.

U.S. Pat. No. 5,054,656 to Lasner discloses a fluid container with a removably attached dosage dispenser receptacle in which the container is provided with a pump for pumping up fluid to the receptacle in predetermined dosages. An opening in the receptacle is aligned with the pump outlet conduit so that fluid can be pumped directly through the outlet conduit to the receptacle in predetermined amounts, and the dispenser can be detached from the container for use when required.

U.S. Pat. No. 5,127,553 to Weinstein discloses a liquid metered dispensing container of the squeezable type. The squeezable container has an opening for dispensing liquid therefrom at one end and a bottom at the other end. A non-flexible trap chamber is connected to the opening and extends outwardly therefrom. The trap chamber has a lower end inserted into the container opening and has an inlet orifice extending from the lower end into the container. The inlet orifice is adapted to receive a dip tube which is attached thereto and extends close to or at the bottom of the container. The trap chamber has an upper end with a dispensing orifice. This is small enough to prevent dripping of liquid therefrom by gravity when the bottle is inverted but is large enough to dispense liquid therefrom when the bottle itself is squeezed. A one way valve is connected to the lower end of the trap chamber which permits liquid to flow from the container to the trap chamber but not vice versa. The trap chamber may have indicia so that exact dosage levels of different amounts may be squeezed into the chamber, or the chamber itself may have a single, predetermined volume.

U.S. Pat. No. 5,224,632 to Murakami, et al. discloses a measuring cap which is attached onto a squeezable bottle, and can extract a desirable amount of liquid inside the bottle into the measuring chamber of the cap by squeezing the body of the bottle. The measuring cap consists of cap main body, inner plug, and supply pipe. The cap main body integrally constituted by the bottle neck engaging wall is a measuring chamber constituted by the circumferential wall of measuring chamber and top wall which forms a pouring mouth at an upper portion, and an upper cap which has a bung that can close the pouring mouth. The inner plug has a discharging pipe and an engaging circumferential wall which engages to the circumferential walls of the measuring chamber, and the discharging pipe and engaging circumferential wall is constituted by being connected with the bottom wall of measuring chamber. The measuring cap is assembled by engaging the inner plug to the cap main body by inserting from below, and engaging the supply pipe to the lower end of the discharging pipe.

U.S. Pat. No. 5,261,569 to Sandwell discloses a squeezable container for containing liquids provided with a transparent measuring cap into which the container's contents can be dispensed by squeezing the container in an upright position. Through a discharging pipe liquid is transported from the container into the measuring space, the bottom of which is formed by an inner plug. To maintain accurate dosing, the transparent measuring cap is detachably connected to the container for cleaning purposes while leaving the plug and the discharging pipe in place.

U.S. Pat. No. 5,381,930 to Kalabakas discloses a dispensing device for dispensing a measured volume of liquid from a body of liquid contained in a container, which includes a receptacle for receiving an unmeasured excess volume of liquid from the body of liquid and a conduit to connect the container to the receptacle. The conduit permits liquid to flow from the body of liquid into the receptacle when a reduced pressure is created in the receptacle. The device further includes a lid to fit over the receptacle so as to be displaceable relative to the receptacle from a closed position to a dispensing position, the arrangement being such that relative displacement between the lid and receptacle can create a pressure differential between the container and the receptacle to cause liquid to flow from the body of liquid in the container to the receptacle. A part of the conduit serves to adjust the unmeasured excess volume of liquid in the receptacle to the measured volume.

U.S. Pat. No. 6,186,367 to Harrold discloses a metered liquid squeezable dispenser, which includes a squeezable container having an open end and neck for dispensing liquid. A trap chamber base non-rotatably attached to the container and a trap chamber is rotatably attached to the trap chamber base. A dip tube is located in the base and extends into the container. There is an air inlet orifice located on the base. The trap chamber has a dispensing outlet, at least one metered dosage inlet pipe passing through the bottom of the trap chamber, extending upwardly therefrom for a predetermined height, and an air pipe passing through its bottom. The base and trap chamber align with one another for squeeze, metered dose filling, and then rotational realignment for squeeze dispensing.

U.S. Pat. No. 6,253,967 to Sperna Weiland discloses an assembly comprising a flexible container in which liquid can be stored and a dosing device connected to the container for dispensing liquid from the container in a dosed manner. The dosing device comprises a filling chamber and means for filling the filling chamber from the container at a selectively settable filling height by squeezing the container. The filling chamber comprises a filling chamber bottom, a vertical sidewall and at least a first and a second channel which each extends upwards from the filling chamber bottom of the filling chamber and each has an inflow opening and an outflow opening. The dosing device further comprises a base bottom connected to the container, the entire filling chamber being rotatably mounted on the base bottom. The base bottom is provided with a through-flow opening which, via a feed line, is in fluid connection with the inner space of the container, while the inflow opening of the first or second channel can selectively be brought into fluid connection with the through-flow opening by rotation of the filling chamber relative to the base bottom.

U.S. Pat. No. 6,330,960 to Faughey, et al. discloses a flexible container for dispensing liquids capable of providing precise dosage of the liquid. The container comprises an upper liquid reservoir and a lower liquid reservoir separated by a gasket, a longitudinal tube extending through the gasket and comprising a slot, and a dispensing tip having a longitudinal sleeve extending therefrom that also comprises a slot and is disposed concentrically around the upper end of the longitudinal tube. Liquid may be transferred from the lower reservoir to the upper reservoir by the application of pressure on the lower reservoir while the two slots are aligned.

In a preferred embodiment, the container is rendered child-resistant through the provision of a cap.

U.S. Pat. No. 7,097,071 to Anderson, et al. discloses an apparatus for measuring and dispensing liquid from a container includes a measuring chamber having an inlet connected to the opening of the container. A cap member is rotatably attached to the measuring chamber. The cap member includes a dispensing outlet and a fill level member. A liquid delivery member is in fluid communication with the measuring chamber and the container. The fill level member is operatively associated with the liquid delivery member to deliver liquid from the container to the measuring chamber. By compressing the container, a volume of liquid is retained within the measuring chamber from flowing back into the container by the fill level member. The measured portion of liquid retained in the measuring chamber is available for dispensing from the dispensing outlet. A method for measuring and dispensing a measured portion of liquid from a container is also disclosed.

United States Patent Application 2008/0308183 to Law discloses one embodiment of a satellite dosing system including a closure that is attached to a container in combination with a dosing module that is removable from the remainder of the closure for the dispensing of a volume of liquid product at the point of use.

United States Patent Application 2011/0284578 to Wong discloses an oil and flavoring pot including a pot body having a measuring cup and a handle. A liquid squeezing structure is disposed on a pot lid and capacity value and a residue recycling structure is formed on a cup wall. The liquid squeezing structure could press the flavoring into the measuring cup by one time or sequence times, and the operation could stop at any time. The amount of the flavoring could be read at any time. When the amount reaches to target, the operation of the liquid squeezing structure could be stopped and the target amount of flavoring is obtained, therefore facilitating to control and know the feeding amount. After use, the residue liquid flows to the groove along wall of the spout, and flows into the measuring cup through the cup slot, therefore keep the pot body clean. Furthermore, the pot is conveniently operated by a single hand.

It is an object of the present invention to improve upon the above art to provide a dispensing cup for an aerosol device that provides a significant advancement to the aerosol dispensing art.

Another object of this invention is to provide a dispensing cup for an aerosol device wherein the aerosol device is actuated by the dispensing cup.

Another object of this invention is to provide a dispensing cup for an aerosol device having a reduced number of parts.

Another object of this invention is to provide a dispensing cup for an aerosol device that includes a lock for inhibiting actuation of the aerosol device by the dispensing cup.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to a dispensing cup for an aerosol device. The aerosol dispenser supplies an aerosol product from an aerosol container through an aerosol valve having a valve stem. The dispensing cup comprises a base defining about an axis of symmetry of the base. A mounting secures the base to the aerosol container. A cup defines a bottom wall and a side wall extending between a bottom side wall end and an upper side wall end. A pouring spout is defined in the side wall of the cup. A cup mounting extends from the cup for removeably securing the cup to the base. A lid is enlargeable with the side wall of the cup for closing the cup. A cup input port is defined in one of the bottom wall and the side wall for engaging with the valve stem of the aerosol valve for supplying aerosol product from the valve stem through the cup input port into the cup upon depression of the cup relative to the aerosol container.

In a more specific embodiment of the invention, the cup input port is defined in the bottom wall. In the alternative, the cup input port is defined in the side wall. The cup input port may include an input duct extending from the bottom wall into the cup in proximity to the upper sidewall end. In one example, the input duct is substantially linear along the length thereof. In an alternative example, the input duct includes a change in direction in proximity to the upper sidewall end. In another example of the invention, a one-way valve is located adjacent to the cup input port.

In another specific embodiment of the invention, the cup mounting rotatably secures the cup to the base between a locked rotational position and an unlocked rotational position. The cup is capable of actuating the aerosol valve for dispensing the aerosol product into the cup when the cup is rotated into the unlocked rotational position. The cup is inhibited from actuating the aerosol valve when the cup is rotated into the locked rotational position. Preferably, the cup is transparent for enabling an operator to view the aerosol product within the cup.

In still another specific embodiment of the invention, the invention is incorporated into an inverted aerosol device for supplying an aerosol product from an aerosol container through an aerosol valve having a valve stem. The inverted aerosol device comprises a base for supporting the inverted aerosol device in an inverted position. A cup defines a bottom wall and a side wall extending between a bottom side wall end and an upper side wall end. A pouring spout is defined in the side wall of the cup. The cup is located below the valve stem of the aerosol valve for supplying aerosol product from the valve stem into the cup upon depression of the aerosol container relative to the base.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
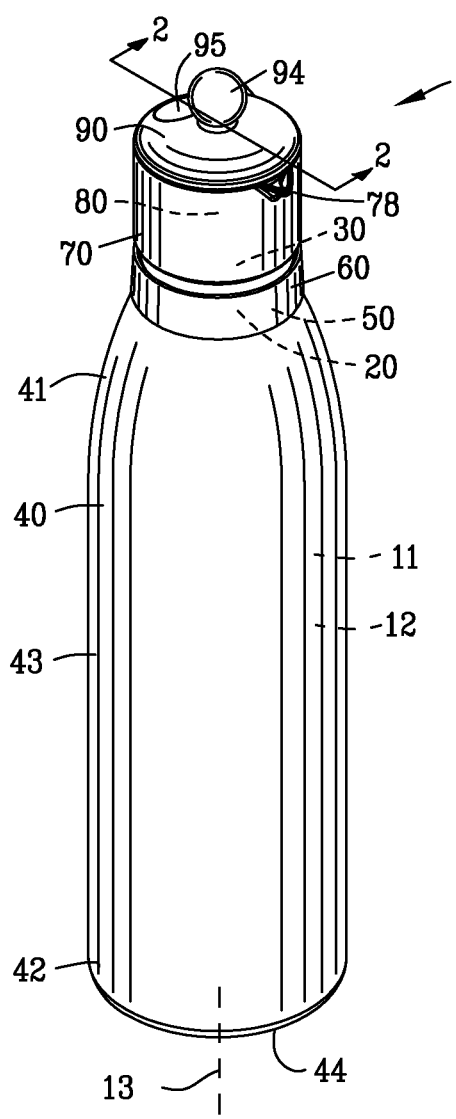
FIG. 1 is a top isometric view of a first embodiment of a dispensing cup for aerosol device of the present invention located on an aerosol container.
Figure 2:
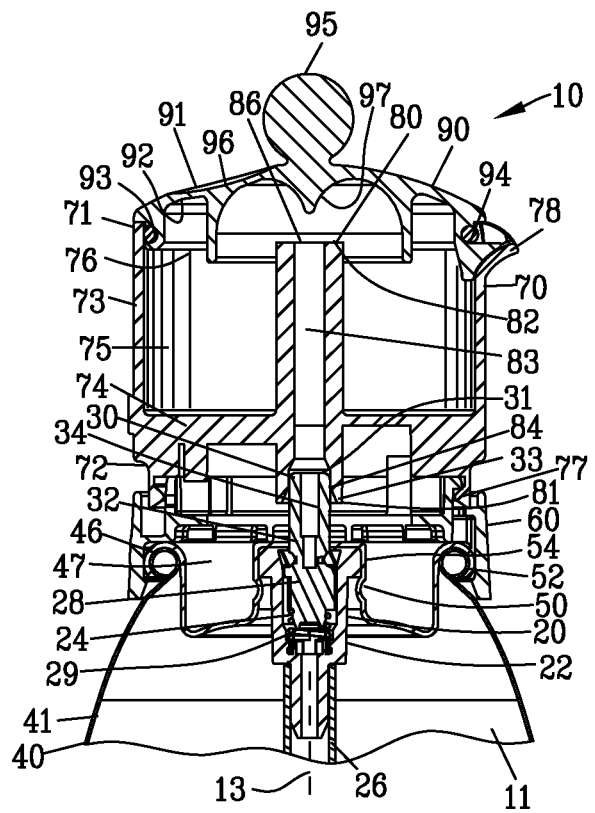
FIG. 2 is an enlarged partial sectional view along line 2-2 in FIG. 1.
Figure 3:
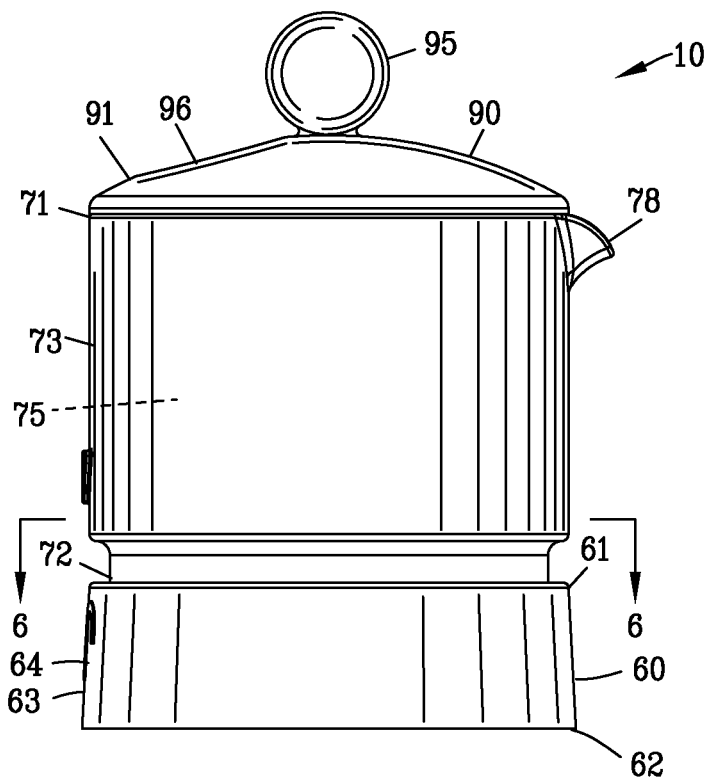
FIG. 3 is an enlarged side view of the dispensing cup of FIG. 1.
Figure 4:
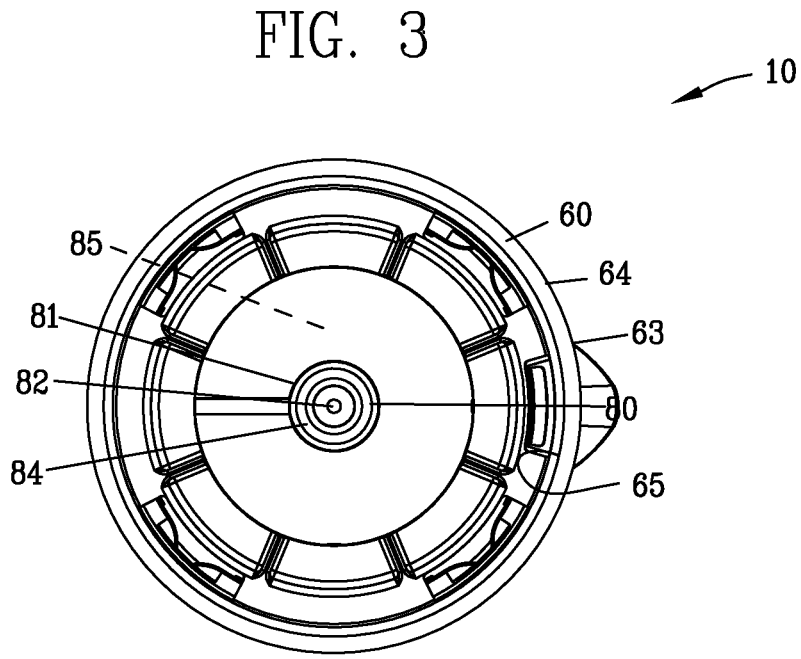
FIG. 4 is a bottom view of FIG. 3.
Figure 5:
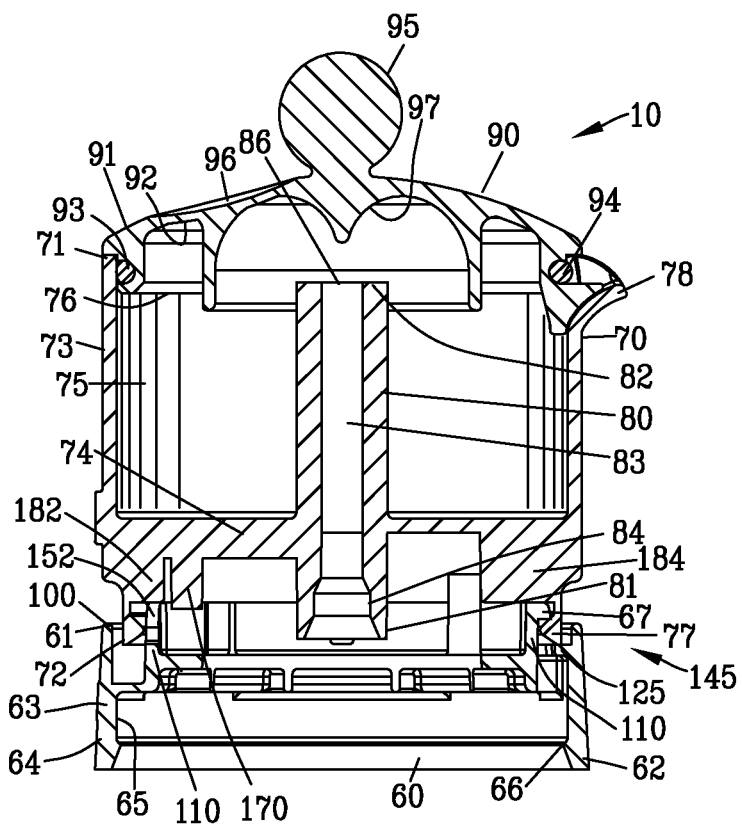
FIG. 5 is a magnified sectional view of the dispensing cup of FIG. 2.
Figure 6:
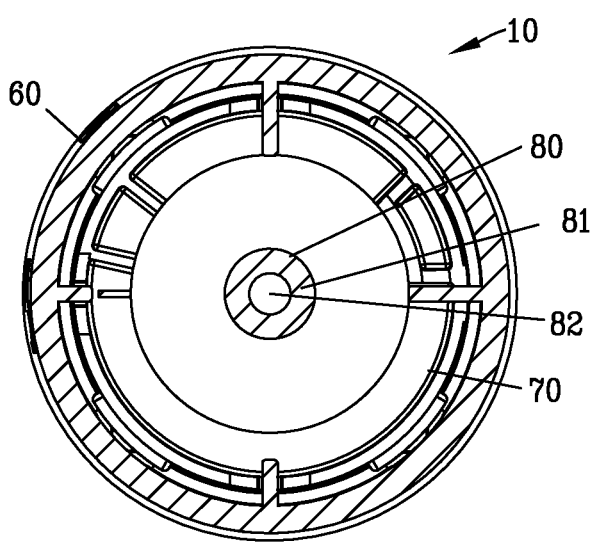
FIG. 6 is a sectional view along line 6-6 in FIG. 3.
Figure 7:
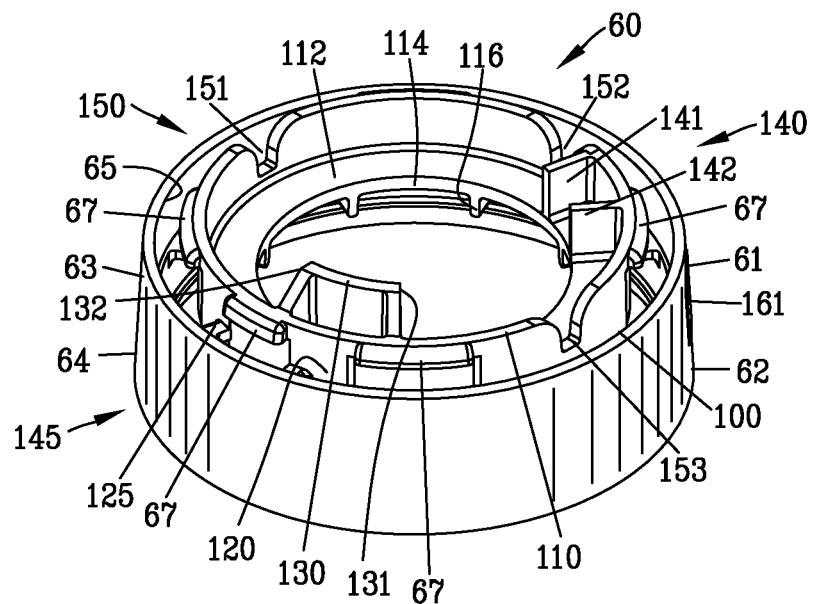
FIG. 7 is a top isometric view of a base of the dispensing cup of FIGS. 1-6.
Figure 8:
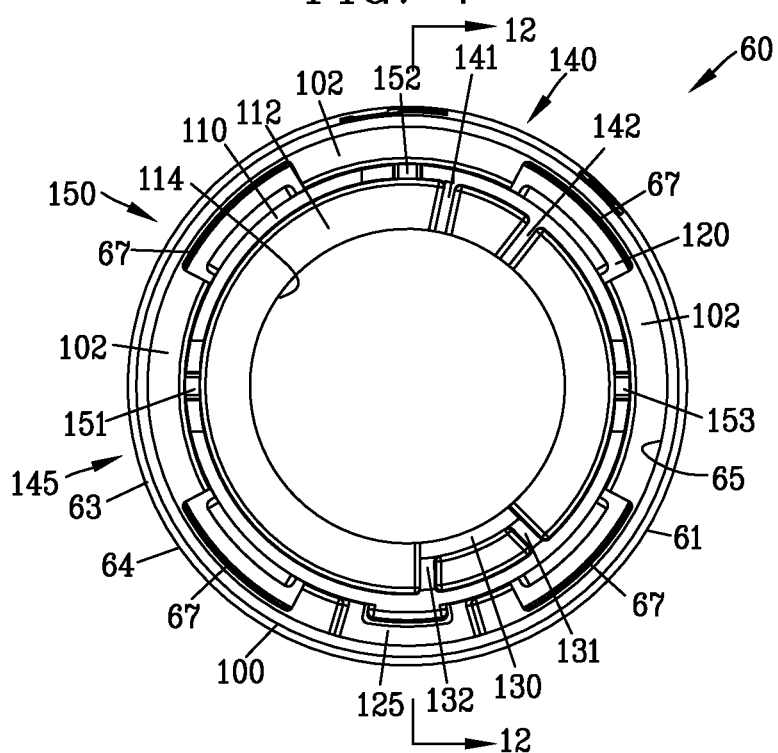
FIG. 8 is a top view of the base shown in of FIG. 7.

FIGS. 1 and 2 illustrate a first embodiment of the improved dispensing cup 10 of the present invention for receiving an aerosol product 11 from an aerosol device through the use of an aerosol propellant 12. The improved dispensing cup 10 subsequently dispenses the aerosol product 11 for an end use. The terms aerosol product 11 and aerosol propellant 12 as used herein includes all types of pressurized package dispensers including pressurized gases or bag on valve dispensers. The improved dispensing cup 10 of the present invention is suitable for dispensing food products and the like.

The first embodiment of the dispensing cup 10 defines an axis of symmetry 13 of the dispensing cup 10. An aerosol valve 20 having a valve stem 30 cooperates with the dispensing cup 10 to control the flow of the aerosol product 11 from an aerosol container 40 into the dispensing cup 10.

The aerosol container 40 is shown as a cylindrical container of conventional design and material. The aerosol container 40 extends between a top portion 41 and a bottom portion 42 with a cylindrical sidewall 43 located therebetween. The bottom portion 42 of the aerosol container 40 is closed by an end wall 44. Although the aerosol container 40 has been shown as a conventional design, it should be understood that the dispensing cup for aerosol device 10 of the present invention may be used with aerosol containers of various designs.

As best shown in FIG. 2, the aerosol container 40 terminates in a bead 46 defining an opening 47 in the aerosol container 40 for receiving a mounting cup 50. The mounting cup 50 includes a peripheral rim 52 for sealing to the bead 46 of the aerosol container 40. The mounting cup 50 further comprises a turret 54 for receiving the aerosol valve 20.

The aerosol valve 20 includes a valve body 22 secured to the turret 54 of the mounting cup 50 by a conventional crimping process. The valve body 22 defines an internal valve cavity 24 in fluid communication with the aerosol container 40 through a dip tube 26. The aerosol valve 20 includes a valve element 28 positioned within the internal valve cavity 24. A bias spring 29 biases the valve element 28 into a closed position to inhibit the flow of the aerosol product 11 through the valve stem 30. Preferably, the aerosol valve 20 incorporates a TPE or Silicone valve or check valve for suitable for use in food applications.

The valve stem 30 extends between a first end 31 and a second end 32 and defines an outer surface 33 with a stem passageway 34 extending therein. The stem passageway 34 provides fluid communication from the internal valve cavity 24 of the valve body 22 to the second end 32 of the valve stem 30. A depression of the valve stem 30 moves the valve element 28 into an open position against the urging of the bias spring 29 to permit the flow of the aerosol product 11 from the second end 32 of the valve stem 30.

FIGS. 3-6 are various enlarged views of the dispensing cup 10 of the present invention. The dispensing cup 10 comprises a base 60 extending between a top portion 61 and a bottom portion 62 with a cylindrical sidewall 63 located therebetween. The sidewall 63 of the base 60 defines an outer surface 64 and an inner surface 65 coaxial with the axis of symmetry 13 of the dispensing cup for aerosol device 10.

The base 60 includes a base mounting 66 for securing the base 60 to the aerosol container 40. The base mounting 66 is shown as annular base projections 66 extending radially inwardly for securing the base 60 to the aerosol container 40. In this example, the annular base projection 66 engages with the bead 46 of the aerosol container 40. However, it should be understood that various conventional structures may be used for securing the base 60 to the aerosol container 40.

The base 60 includes a base retainer 67 for rotationally securing a cup 70 to the base 60. The base retainer 67 comprises a plurality of annular projections 67 extending radially outwardly from the base 60. The plurality of annular projections 67 are distributed about the axis of symmetry 13 of the dispensing cup for aerosol device 10.

The cup 70 extends between a top portion 71 and a bottom portion 72 with a cylindrical sidewall 73 located therebetween. The sidewall 73 of the cup 70 is a substantially rigid sidewall 73 coaxial with the axis of symmetry 13. A rigid bottom wall 74 is unitary with the sidewall 73 to define an inner space 75 of the cup 70.

The cup 70 includes a cup retainer 77 for cooperating with the base retainer 67 for rotationally securing the cup 70 to the base 60. The cup retainer 77 is shown as a plurality of annular projections 77 extending radially inwardly from the sidewall 73 of the cup 70. The radially inwardly extending cup retainers 77 cooperate with the radially outwardly extending base retainers 67 for rotationally securing the cup 70 to the base 60.

The top portion 71 of the cup 70 comprises an open top 76. The open top 76 defines a spout 78 for pouring the aerosol product 11 from the cup 70 after the aerosol product 11 is dispensed from the aerosol container 40 into the cup 70.

A nozzle 80 extends from a proximal end 81 to a distal end 82 with a nozzle channel 83 extending therebetween. The nozzle 80 is supported by the rigid bottom wall 74 into the inner space 75 of the cup 70. In this embodiment, the nozzle 80 is unitary with the cup 70. The proximal end 81 of the nozzle channel 83 includes a socket 84 for communication with the aerosol valve 20. The socket 84 frictionally receives the second end 32 of the valve stem 30. The distal end 82 of the nozzle channel 83 terminates in a terminal orifice 86. The nozzle 80 is unitary with the cup 70.

A lid 90 is provided to seal with the open top 76 of the cup 70 through a frictional engagement. The lid comprises a top portion 91 and a bottom portion 92. A sidewall seal 93 shown as a gaskets seals with the open top 76 of the cup 70. A spout seal 94 extends from the lid 90 for sealing the spout 78 of the lid 90. The sidewall seal 93 and the spout seal 94 function in concert to completely seal the inner space 75 of the cup 70 when the lid 90 is frictionally affixed to the cup 70 to prevent undesired discharge from the cup 70 during actuation of the aerosol valve 20. The lid 90 is provided with a handle 95 extending from the top portion 91 for affixing and removing the lid 90 from the cup 70. An actuator surface 96 is defined in the top portion 91 of the lid 90 for actuating the aerosol valve 20 as will be described in greater detail hereinafter. The actuator surface 96 is shown as a depression in the top portion 91 of the lid 90 for receiving a finger tip of a user.

A deflection surface 97 is defined by the bottom portion 92 of the lid 90. The deflection surface 97 directs the aerosol product 11 emanating upwardly from the terminal orifice 86 into the inner space 75 of the cup 70. In this example, the deflection surface 97 comprises two arcuate deflection surfaces 97 but it should be understood that various shapes of deflection surfaces 97 may be utilized for directing the aerosol product 11 into the inner space 75 of the cup 70.

As will be described in greater detail hereinafter, the cup 70 is tiltable relative to the base 60 for actuating the aerosol valve 20 to dispense the aerosol product 11 from the aerosol container 40 through the nozzle 80 into the inner space 75 of the cup 70.

The cup 70 is rotatable relative to the base 60 between a locked rotational position as shown in FIGS. 13-16 to an unlocked rotational position as shown in FIGS. 17-20. The cup 70 is inhibited from tilting relative to the base 60 when the cup 70 is moved into the locked rotational position as shown in FIGS. 13-16. The cup 70 is tiltable relative to the base 60 to dispense the aerosol product 11 from the aerosol container 40 when the cup 70 is rotated into the unlocked rotational position as shown in FIGS. 17-20.

FIGS. 6-12 are various views further illustrating the base 60 shown in FIGS. 1-6. The first end 61 of the base 60 defines an outer ring 100. The outer ring 100 is a substantially cylindrical upper portion of the cylindrical sidewall 63. A plurality of radial ribs 102 extend inwardly from the inner surface 65 of the cylindrical sidewall 63. The plurality of radial ribs 102 supports an inner ring 110. The outer ring 100 and the inner ring 110 are coaxial with the axis of symmetry 13 of the dispensing cup for aerosol device 10.

An inner base platform 112 extends radially inwardly from the inner ring 110 and defines a central platform aperture 114 coaxial with the outer ring 100 and the inner ring 110. Preferably, the plurality of radial ribs 102 and the inner ring 110 and the inner base platform 112 are integrally formed with the base 60. As best shown in FIGS. 1I and 12, an array of base platform ribs 116 extend from the inner ring 110 to support the underside of the inner base platform 112. The inner base platform 112 defines a central platform aperture 114.

The inner ring 110 supports the base retainer 67 for cooperating with the cup retainer 77 for rotationally securing the cup 70 to the base 60. The base retainer 67 is shown as a plurality of annular projections 67 extending radially outwardly from the inner ring 110 of the base 60. The plurality of annular projections 67 are distributed about the axis of symmetry 13 of the dispensing cup for aerosol device 10.

Preferably, the inner ring 110 of the base 60 is deformable for enabling the cup retainer 77 to pass over the base retainer 67. After the cup retainer 77 passes over the base retainer 67, the base retainer 67 engages with the cup retainer 77 to retain the cup 70 on the base 60. The cup retainer 77 of the cup 70 interlocks with the base retainer 67 for rotationally securing the cup 70 to the base 60.

A void 120 is defined between the outer ring 100 and the inner ring 110 of the base 60. A bridge 125 extends across the void 120 between the outer ring 100 and the inner ring 110 of the base 60. Preferably, the bridge 125 extends across a portion of the void 120 and is located at a level below the first end 61 of the base 60. The bridge 125 occupies a minor portion of the circumference of the inner ring 110. In this example, the bridge 125 occupies a five to ten degree arc portion of the circumference of the inner ring 110 about the axis of symmetry 13 of the dispensing cup for aerosol device 10.

The base 60 includes a base stop 130 for cooperating with the cup 70 for establishing an unlocked rotational position and a locked rotational position of the cup 70 relative to the base 60. More specifically, the base stop 130 extends upwardly from the inner base platform 112 and extends inwardly from the inner ring 110 to selectively interfere with the rotation of the cup 70. The base stop 130 includes a locked position stop 131 and an unlocked position stop 132 defined by circumferentially spaced apart lateral surfaces 131 and 132 of the base stop 130. Preferably, the base stop 130 is integrally formed with the inner ring 110 and the inner base platform 112. The locked position stop 131 establishes a locked rotational position of the dispensing cup relative to the base 60 as shown in FIGS. 13-16. The unlocked position stop 132 establishes an unlocked rotational position of the dispensing cup relative to the base 60 as shown in FIGS. 17-20.

The base 60 includes audible cup rib 140 for cooperating with the cup 70 for audibly indicating the rotational position of the cup 70 relative to the base 60. In this example, the audible cup rib 140 comprises plural audible cup ribs 141 and 142. Each of the plural audible cup ribs 141 and 142 extends upwardly from the inner base platform 112 and extends inwardly from the inner ring 110.

The dispensing cup for aerosol device 10 comprises a lock 145 for locking the tilting of the cup 70 relative to the base 60. The lock 145 includes a groove 150 defined on the base 60 cooperating with a groove rib 180 extending from the cup

Figure 19:
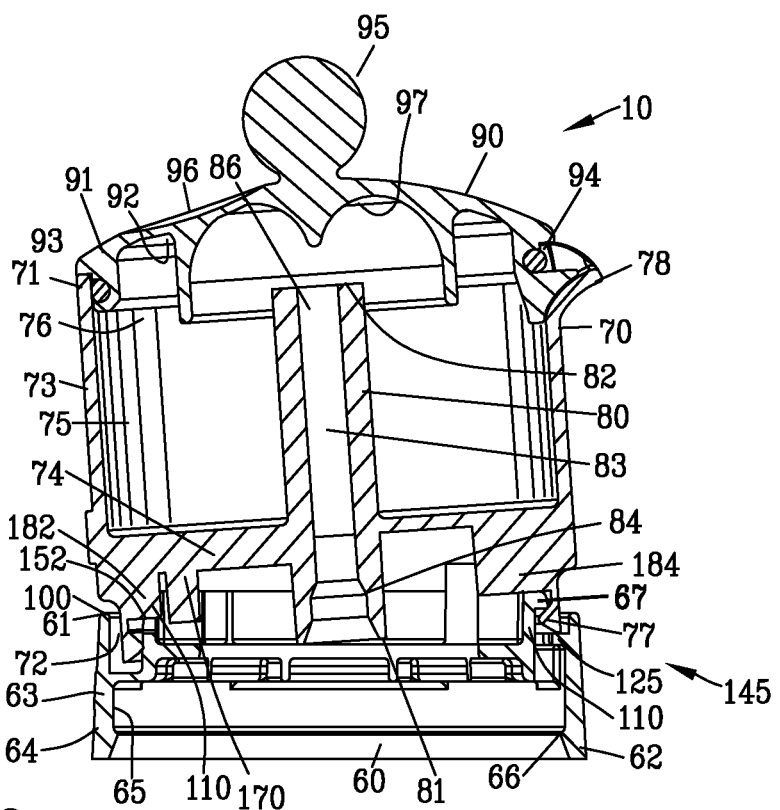
FIG. 19 is a sectional view along line 19-19 in FIG. 17 illustrating the dispensing cup being in an actuated position.
Figure 20:
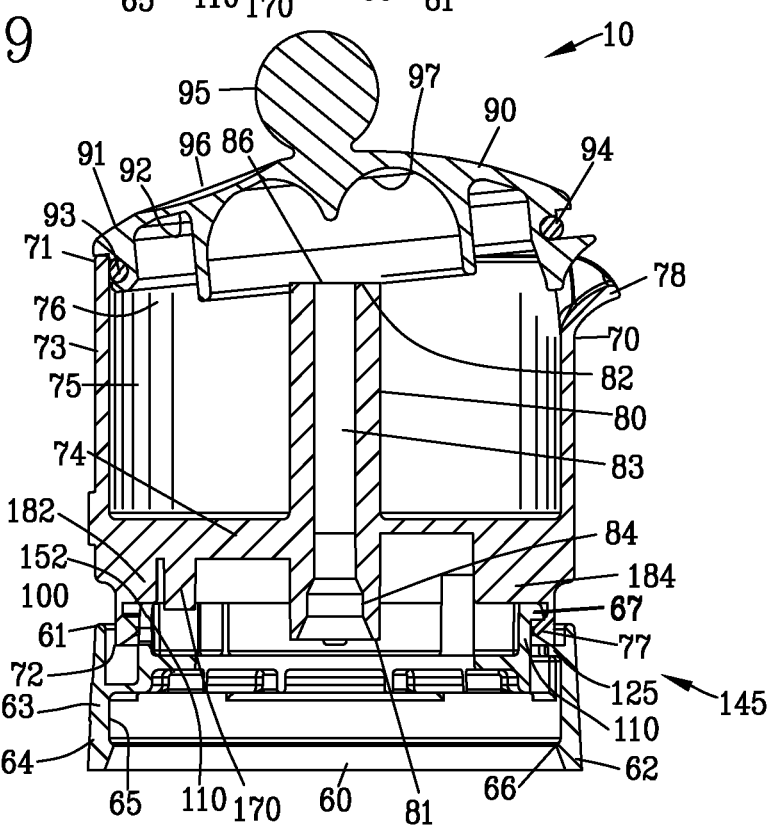
FIG. 20 is a sectional view similar to FIG. 19 with a lid being lifted and removed from the dispensing cup.

70. The groove 150 is defined in the inner ring 110 of the base 60 for enabling the cup 70 to be tilted relative to the base 60 as shown in FIGS. 19-20. More specifically, the groove 150 includes a plurality of grooves 151-153 formed within the inner ring 110 of the base 60. Each of the plurality of grooves 151-153 extends through the inner ring 110 to a level in proximity to the inner base platform 114 of the base 60.

Figure 9:
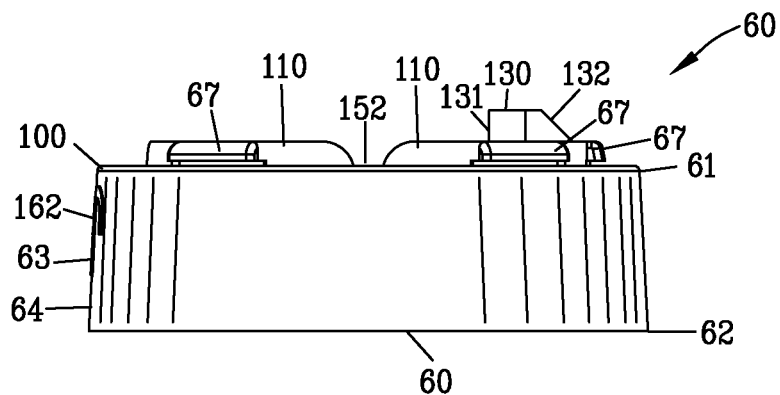
FIG. 9 is a right side view of the base of FIG. 7.
Figure 10:
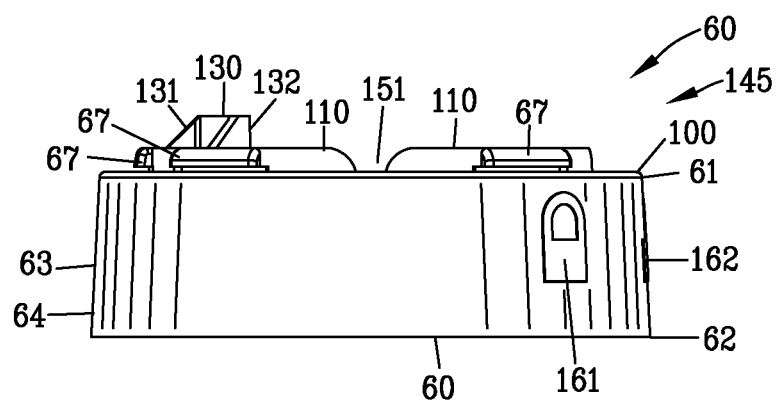
FIG. 10 is a left side view of the base of FIG. 7.
Figure 11:
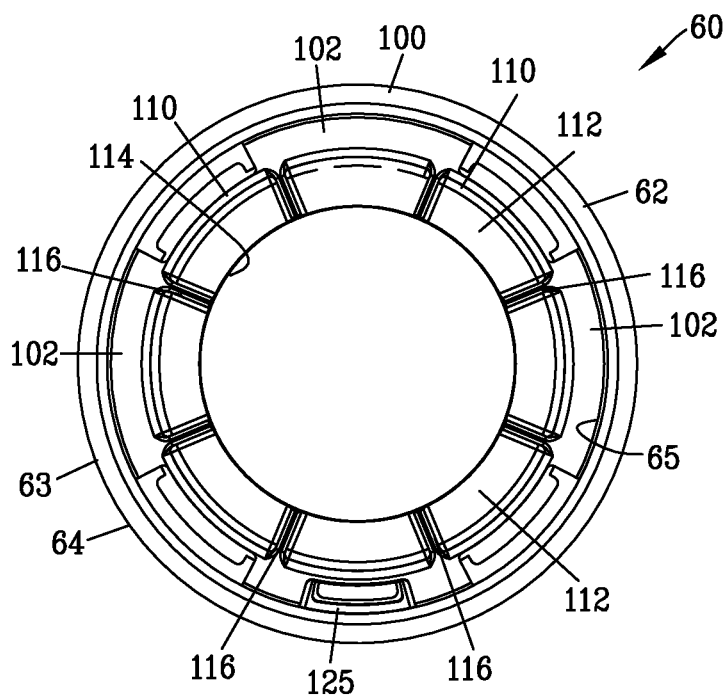
FIG. 11 is a bottom view of FIG. 8.
Figure 12:
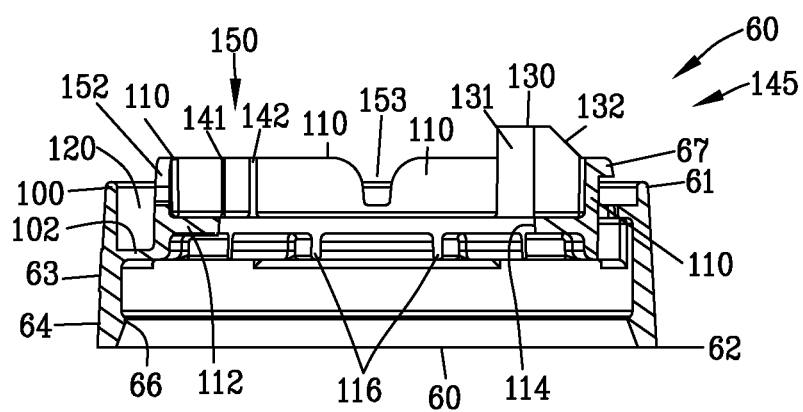
FIG. 12 is a sectional view along line 12-12 in FIG. 8.
Figure 13:
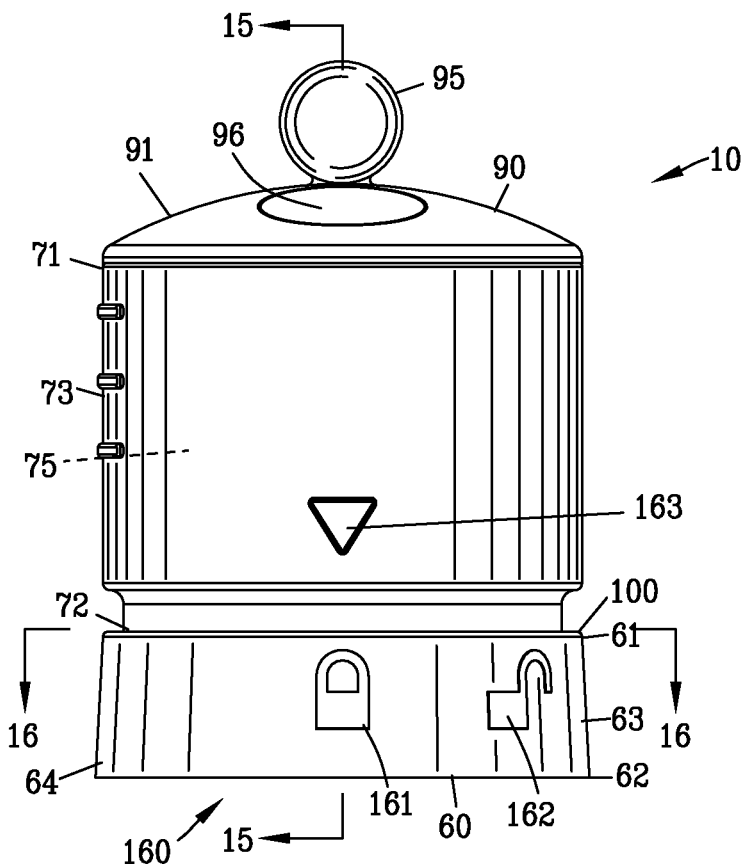
FIG. 13 is a side view of the dispensing cup of FIGS. 1-6 with the dispensing cup being located in a locked rotational position.
Figure 14:
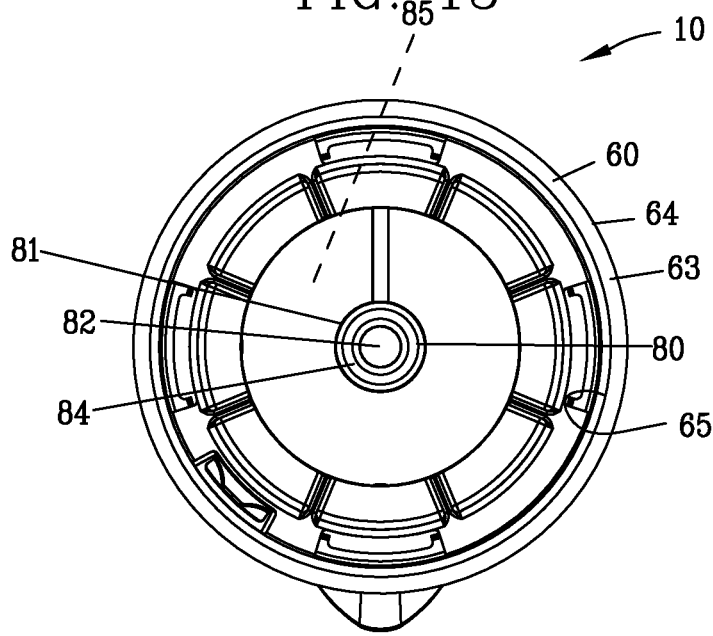
FIG. 14 is a bottom view of FIG. 13.
Figure 15:
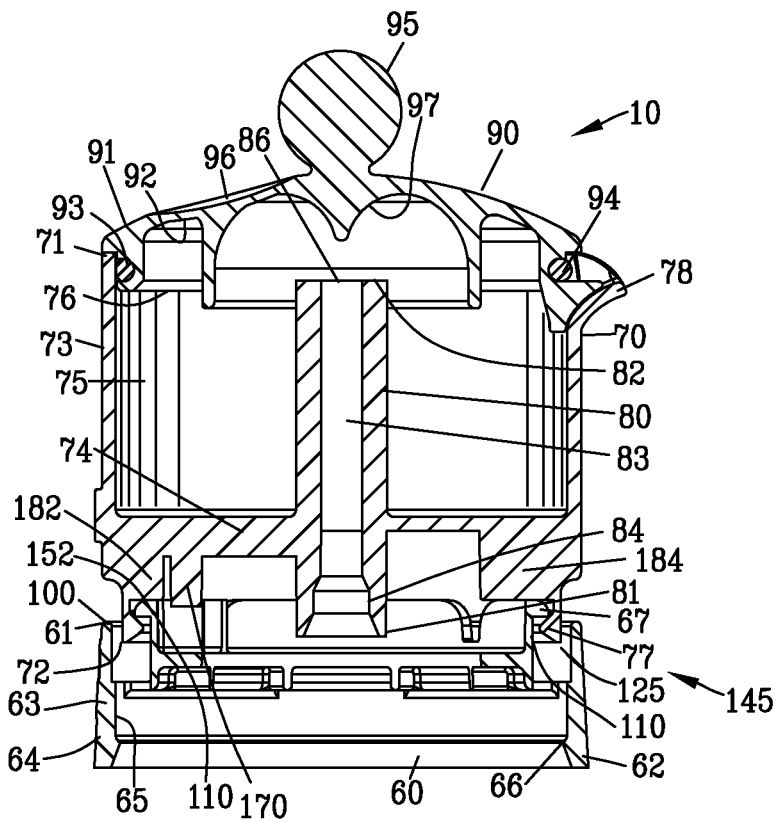
FIG. 15 is a sectional view along line 15-15 in FIG. 13.
Figure 16:
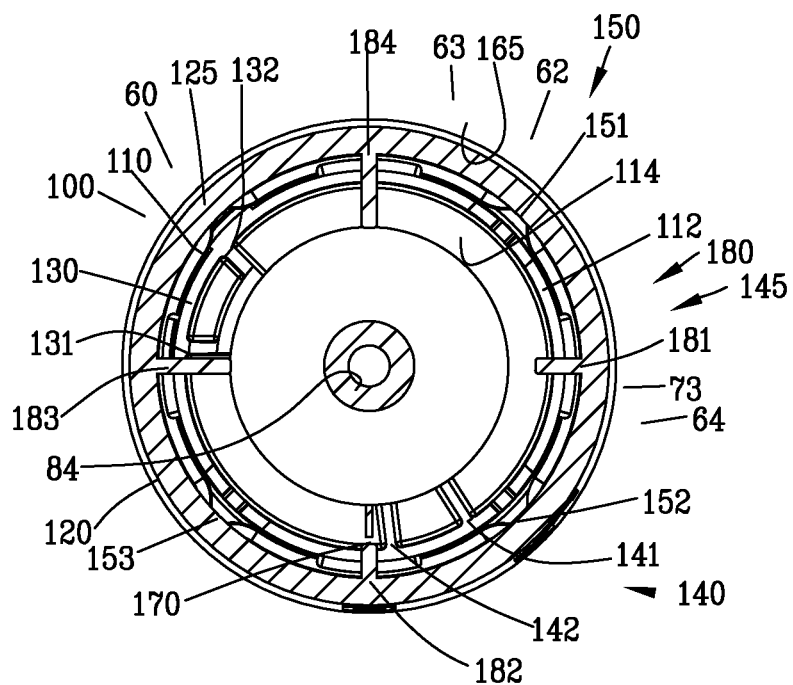
FIG. 16 is a sectional view along line 16-16 in FIG. 13.
Figure 17:
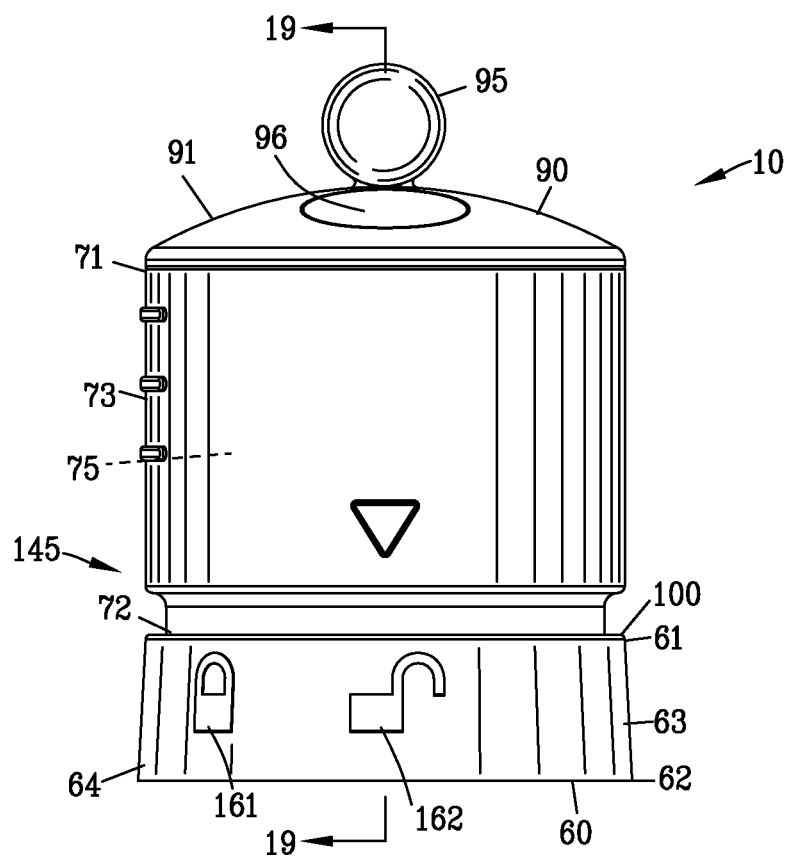
FIG. 17 is a side view of the dispensing cup of FIGS. 1-6 with the dispensing cup being located in an unlocked rotational position.
Figure 18:
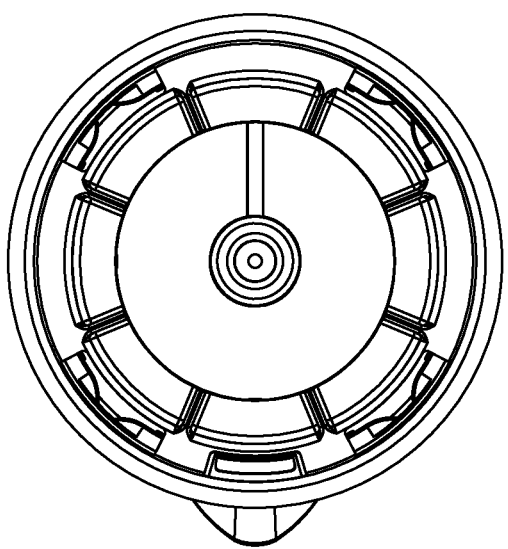
FIG. 18 is a bottom view of FIG. 17.

Referring to FIGS. 9 and 10, the dispensing cup 10 may include a rotation indicator 160 for indicating the rotational position of the cup 70 relative to the base 60. Preferably, the rotation indicator 160 includes a locked rotational position indicator 161 and an unlocked rotational position indicator 162. An arrow located on the cup 70 functions as an alignment indicator for the locked and unlocked rotational position indicators 161 and 162. In this example, the locked and unlocked rotational position indicators 161 and 162 are located on the outer surface 64 of the base 60, but it should be appreciated by those skilled in the art that numerous variations in the arrangement of the rotation indicator 160 may be incorporated within the present invention Referring back to FIG. 5, the interior of the cup 70 includes an audible emitting rib 170 extending from the bottom wall 74 of the cup 70. The audible emitting rib 170 interacts with the plural audible cup ribs 141 and 142 of the base 60. The audible emitting rib 170 sequentially contacts the plural audible cup ribs 141 and 142 to produce an audible double click upon rotation of the cup 70 relative to the base 60 when the cup 70 is moved between the locked and unlocked rotational position.

The cup 70 includes the groove rib 180 extending from the bottom wall 74 of the cup 70. Preferably, the groove rib 180 is formed as a one-piece unit with the cup 70. More specifically, the groove rib 180 includes plural grooves 181-184 equally spaced about the axis of symmetry 13 of the dispensing cup 10.

The plurality of groove ribs 181-184 of the cup 70 are misaligned with the plurality of grooves 151-153 defined by the inner ring 110 of the base 60 when the cup 70 is located in the locked rotational position as shown in FIGS. 13-16.

The plurality of groove ribs 181-184 of the cup 70 are aligned with the plurality of grooves 151-153 defined by the inner ring 110 of the base 60 when the cup 70 is established in the unlocked rotational position as shown in FIGS. 17-20. In the unlocked rotational position, the groove rib 184 is aligned with the bridge 125.

As will be described hereinafter, the groove ribs 183 and 184 interact with the locked position stop 131 and the unlocked position stop 132 of the base stop 130 for establishing the locked rotational position and the unlocked rotational position of the cup 70 relative to the base 60.

FIGS. 13-16 are various views of the dispensing cup 10 of FIGS. 1-6 with the cup 70 being located in the locked rotational position. The cup 70 is rotated clockwise relative to the base 60 until the groove rib 183 of the cup 70 engages the lock position stop 131 of the base 60. During the clockwise rotation of the cup 70 from the unlocked rotational position to the locked rotational position, the audible emitting rib 170 of the cup 70 passes over the plural audible ribs 141 and 142, respectively, to provide two independent audible clicks. The audible emitting rib 170 of the cup 70 cooperates with the audible rib 142 to maintain the cup 70 in the locked rotational position.

When the cup 70 is moved into the locked rotational position, the nozzle 80 is inhibited from actuating the aerosol valve 20. In the locked rotational position, the plurality of groove ribs 181-184 engage with the inner ring 110 of the base 60 to prevent the cup 70 from tilting relative to the base 60.

FIGS. 17-20 are various views of the dispensing cup 10 of FIGS. with the cup 70 being located in the unlocked rotational position and with the cup 70 being in an actuated position. The cup 70 has been rotated counterclockwise relative to the base 60 until the groove rib 183 of the cup 70 engages the unlock position stop 132 of the base 60. During the counterclockwise rotation of the cup 70 from the locked rotational position to the unlocked rotational position, the audible emitting rib 170 of the cup 70 passes over the plural audible ribs 142 and 141, respectively, to provide two independent audible clicks. The audible emitting rib 170 of the cup 70 cooperates with the audible rib 141 to maintain the cup 70 in the unlocked rotational position.

When the cup 70 is located in the unlocked rotational position, the plurality of groove ribs 181-183 are aligned with the plurality of grooves 151-153 of the base to enable the cup 70 to tilt relative to the base 60. The groove rib 184 is aligned with the bridge 125. The alignment of the groove ribs 181-183 with the grooves 151-153 permits the cup 70 to be tilted relative to the base 60 to actuate the aerosol valve 20.

FIG. 19 illustrates the cup 70 being titled into the actuated position by a depression of the actuator surface 96 on the lid 90. A depression of the actuator surface 96 on the lid 90 by an operator causes the cup 70 to tilt about the bridge 125. The cup 70 tilts in its entirety as a unit relative to the base 60 as the plurality of groove ribs 181-183 enter the plurality of grooves 151-153 defined in the inner ring 110 of the base 60. The groove rib 184 is aligned with the bridge. A portion of the sidewall 73 of the cup 70 enters the void 120 between the outer ring 100 and the inner ring 110.

The tilting of the cup 70 about the bridge 125 actuates the aerosol valve 20 to discharge aerosol product 11 upwardly from the terminal orifice 86 of the nozzle 80. The aerosol product 11 emanating upwardly from the terminal orifice 86 of the nozzle 80 strikes the deflection surface 97 of the lid 90. The deflection surface 97 redirects the aerosol product 11 into the cup 70. Preferably, the cup 70 is transparent or translucent to enable an operator to visually observe the amount of aerosol product 11 within the cup 70.

FIG. 20 is a sectional view similar to FIG. 19 with a lid 90 being lifted and removed from the cup 70. The removal of the lid 90 and enables the aerosol product 11 within the cup 70 to be poured from the spot 78 for the end use. In this example, the aerosol container 40 as well as the cup 70 is tilted to pour the aerosol product 11 from the cup 70. In the alternative, the lid 90 may be permanently mounted to the cup 70.

Figure 22:
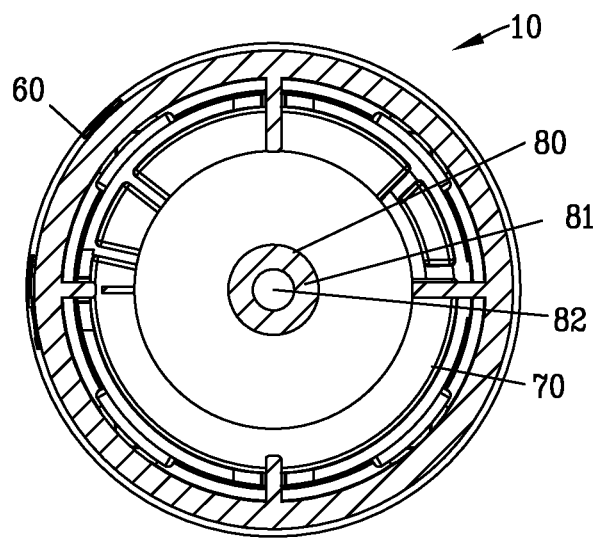
FIG. 22 is a sectional view along line 22-22 in FIG. 21.
Figure 23:
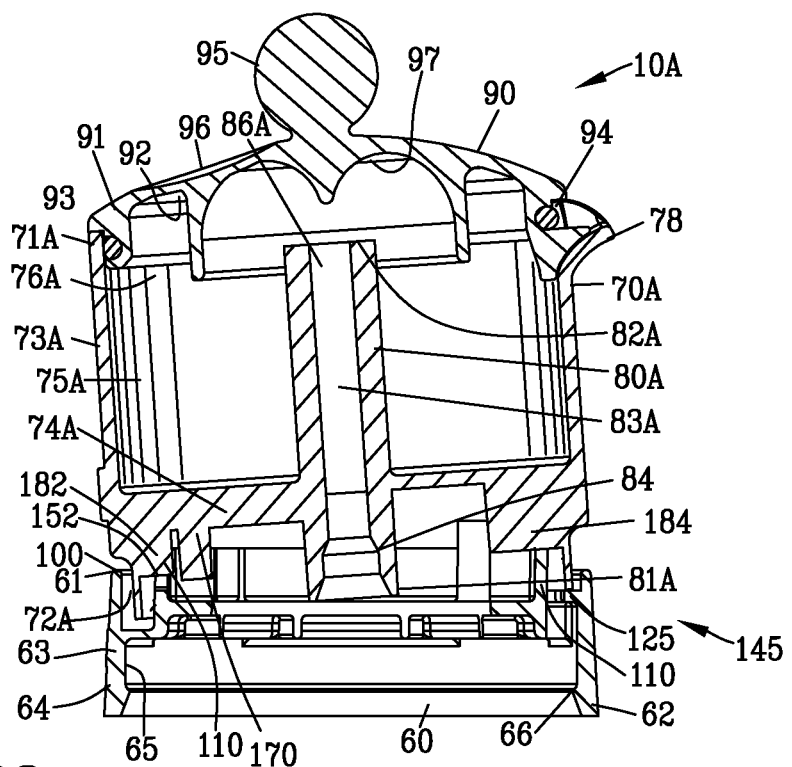
FIG. 23 is a sectional view similar to FIG. 21 illustrating the second embodiment of the dispensing cup being in an actuated position.
Figure 24:
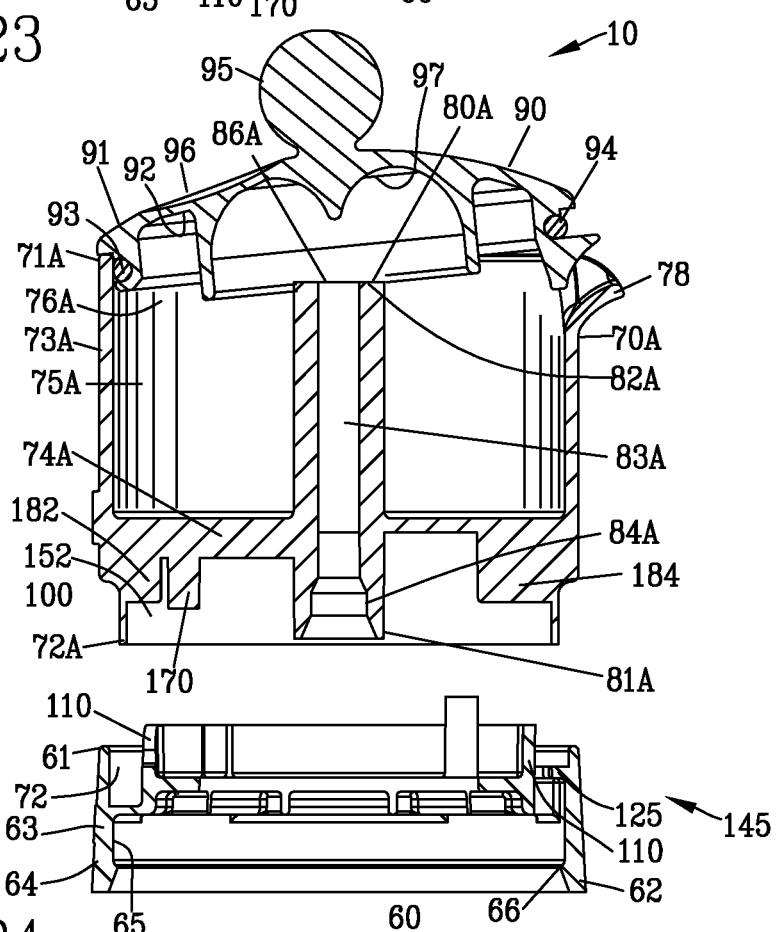
FIG. 24 is a sectional view similar to FIG. 21 illustrating the second embodiment of the dispensing cup removed from the base and with a lid being removed from the dispensing cup.

FIGS. 22-24 are various views of a second embodiment of the dispensing cup 10A of the present invention. The second embodiment of the dispensing cup 10A is similar to the first embodiment of the dispensing cup 10 of FIGS. 1-20 with similar parts labeled with similar references numbers with the addition of the alphabetical character A. In this embodiment, the base 60A lacks a base retainer 67 and the cup 70 lacks a cup retainer 77 shown in FIGS. 2, 5, 15 and 19-20.

Figure 21:
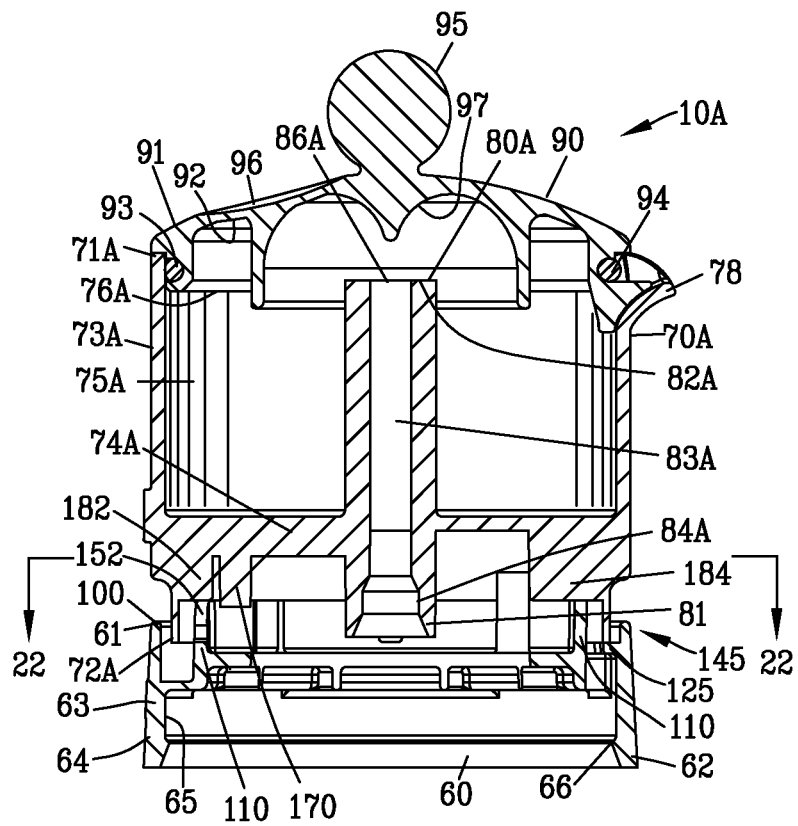
FIG. 21 is a side sectional view of a second embodiment of the dispensing cup of the present invention.

FIG. 23 is a sectional view similar to FIG. 21 illustrating the second embodiment of the cup 70A being tilted into an actuated position to fill the cup 70A with the aerosol product 11. The tilting of the cup 70A relative to the base 60A is identical to the first embodiment shown in FIGS. 1-20.

FIG. 24 is a sectional view similar to FIG. 21 illustrating the cup 70A removed from the base 60A and with a lid 90 being removed from the cup 70A. The absence of the base retainer 67 and the cup retainer 77 of FIGS. 2, 5, 15 and 19-20 enables the cup 70A to be removed from the base 60A after dispensing of the aerosol product 11 into the cup 70A. In contrast to the first embodiment of the invention, only the cup 70A need to be tilted to pour the aerosol product 11 from the cup 70A.

Figure 25:
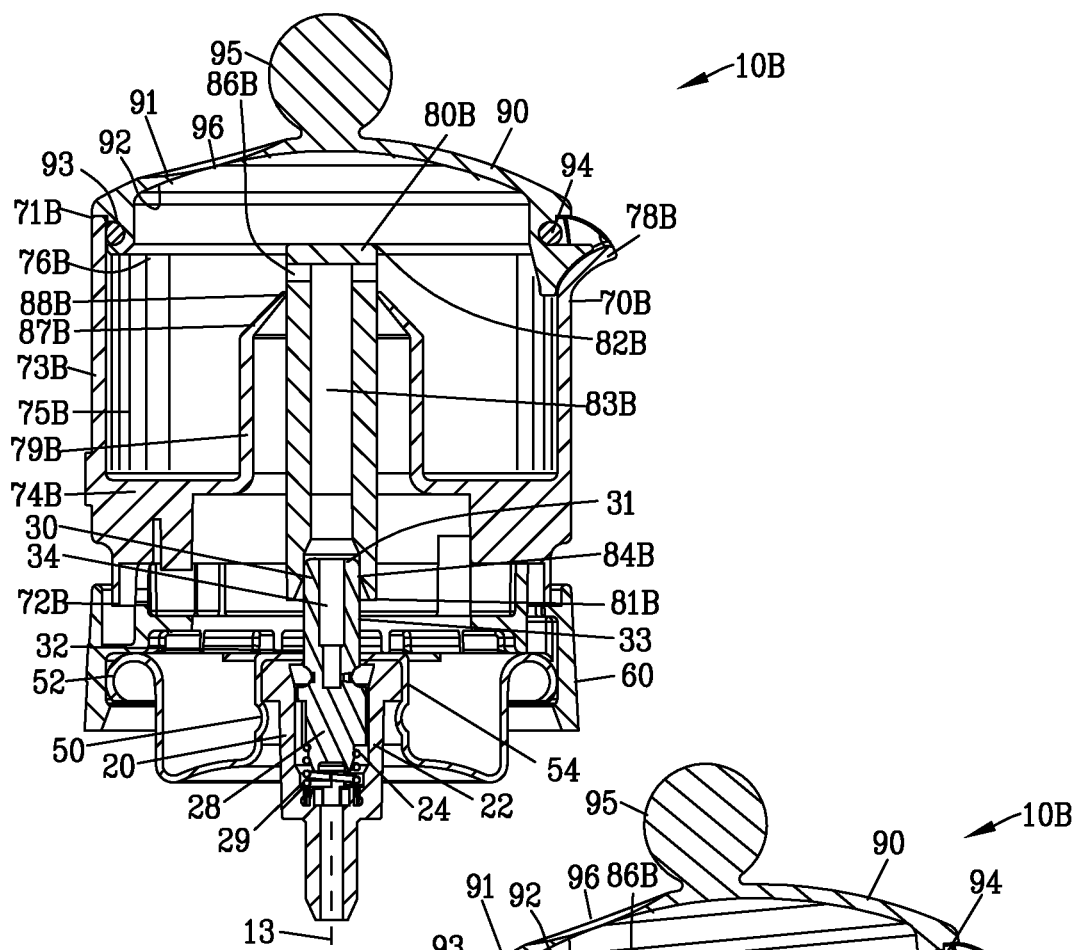
FIG. 25 is a side sectional view of a third embodiment of the dispensing cup located on an aerosol mounting cup.
Figure 26:
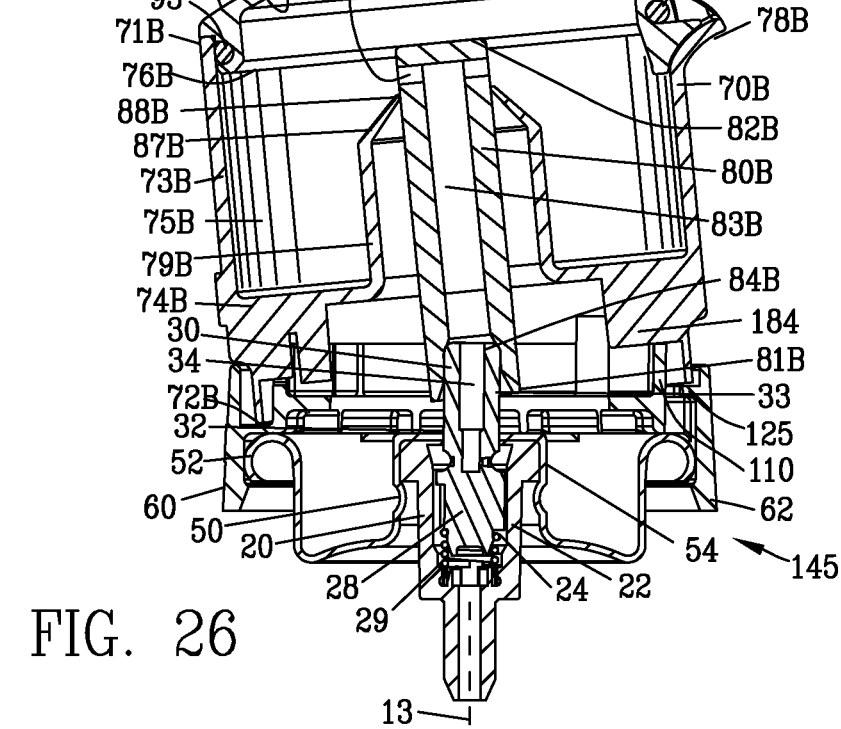
FIG. 26 is a sectional view similar to FIG. 25 illustrating the third embodiment of the dispensing cup being in an actuated position.
Figure 27:
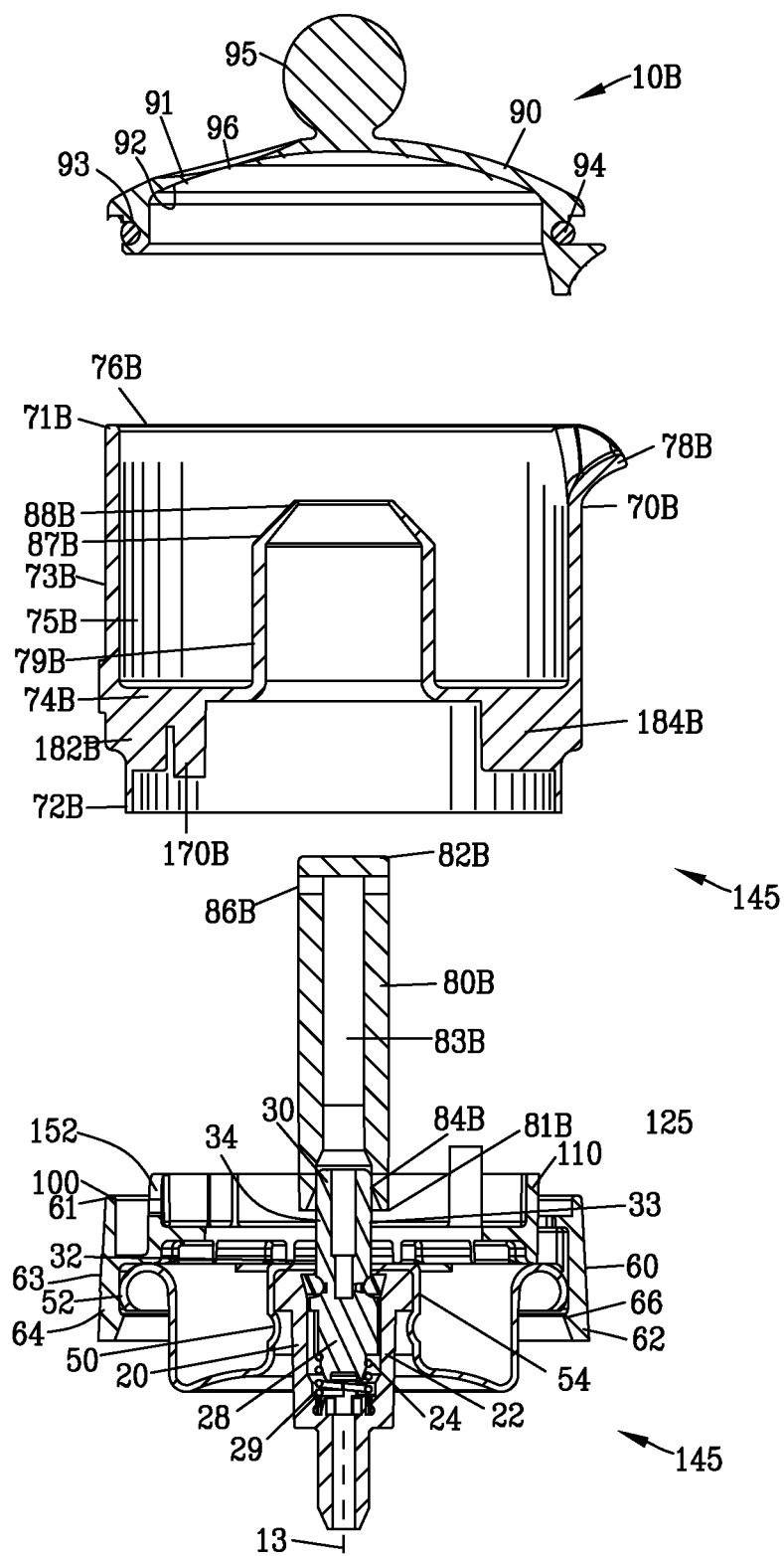
FIG. 27 is a disassembled view of the third embodiment of the dispensing cup of FIGS. 25 and 26.

FIGS. 25-27 are various views of a third embodiment of the dispensing cup 10B of the present invention. The third embodiment of the dispensing cup 10B is similar to the first embodiment of the dispensing cup 10 of FIGS. 1-20 with similar parts labeled with similar references numbers with the addition of the alphabetical character B. In this embodiment, the nozzle 80B is a separate component part from the dispensing cup 10B.

The cup includes an inner wall 79B having a resilient conical portion 87B terminating in a resilient circular aperture 88B. The nozzle 80B extends from a proximal end 81B to a distal end 82B with a nozzle channel 83B extending therebetween. The nozzle 80B is supported by the valve stem 40. The proximal end 81B of the nozzle channel 83B includes a socket 84B for communication with the aerosol valve 20. The socket 84B frictionally receives the second end 32 of the valve stem 30. The distal end 82B of the nozzle channel 83B terminates in a terminal orifice 86B. In this embodiment, the terminal orifice 86B is located on the side surface of the nozzle 80B and in proximity to the distal end 80B. The terminal orifice 86B discharges the aerosol product 11 perpendicular to the axis of symmetry 13. The discharging the aerosol product 11 perpendicular to the axis of symmetry 13 eliminates the need for the deflection surface of 97 of the lid 90 shown in FIGS. 1-20.

FIG. 26 illustrates the third embodiment of the dispensing cup 10B being in an actuated position for dispensing aerosol product 11 into the cup 70B. The tilting of the cup 70B relative to the base 60B is identical to the first embodiment shown in FIGS. 1-20.

FIG. 27 is a disassembled view of the third embodiment of the dispensing cup 10B of FIGS. 25 and 26. In a manner similar to the second embodiment shown in FIGS. 22-24, the base 60B lacks the base restraint 67B and the cup 70 lacks a cup retainer 77 for enabling removal of the cup 70B from the base 60B. As the cup 70 is removed from the base 60B, the resilient circular aperture 88B resiliently slides along the outer surface of the nozzle 80B thereby wiping any residual aerosol product 1 from the outer surface of the nozzle 80B. After the cup 70B is removed from the base 60B, the aerosol product 11 is poured from the cup 70B as set forth previously.

The present invention provides an improved dispensing cup for an aerosol device. The dispensing cup actuates the aerosol device upon a depression of a dispenser head. The dispensing cup has a reduced number of parts and preferably a base and a dispensing cup. The dispensing cup for aerosol device includes a lock for inhibiting actuation of the dispensing cup for aerosol device.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A dispensing cup for an aerosol device, the aerosol dispenser supplying an aerosol product from an aerosol container through an aerosol valve having a valve stem, comprising:
   a base defining about an axis of symmetry of said base;
   a mounting for securing said base to the aerosol container;
   a cup defining a bottom wall and a side wall extending between a bottom side wall end and an upper side wall end;
   a pouring spout defined in said side wall of said cup;
   a cup mounting extending from said cup for removeably securing said cup to said base;
   a lid engageable with said side wall of said cup for closing said cup; and
   a cup input port defined in one of said bottom wall and said side wall for engaging with the valve stem of the aerosol valve for supplying aerosol product from said valve stem through said cup input port into said cup upon depression of said cup relative to the aerosol container.

2. A dispensing cup for an aerosol device as set forth in claim 1, wherein said cup input port is defined in said bottom wall.

3. A dispensing cup for an aerosol device as set forth in claim 1, wherein said cup input port is defined in said side wall.

4. A dispensing cup for an aerosol device as set forth in claim 1, wherein said cup input port includes a nozzle extending from said bottom wall into said cup in proximity to said upper sidewall end.

5. A dispensing cup for an aerosol device as set forth in claim 1, wherein said cup input port includes a nozzle extending from said bottom wall into said cup in proximity to said upper sidewall end; and
   said nozzle being substantially linear along the length thereof.

6. A dispensing cup for an aerosol device as set forth in claim 1, wherein said cup input port includes a nozzle independent of said cup.

7. A dispensing cup for an aerosol device as set forth in claim 1, wherein said cup input port includes a nozzle extending from said bottom wall into said cup in proximity to said upper sidewall end; and
   said nozzle includes a change in direction in proximity to said upper sidewall end.

8. A dispensing cup for an aerosol device as set forth in claim 1, including a one-way valve located adjacent to said cup input port.

9. A dispensing cup for an aerosol device as set forth in claim 1, wherein said cup mounting rotatably secures said cup to said base between a locked rotational position and an unlocked rotational position;
   said cup being capable of actuating the aerosol valve for dispensing the aerosol product into said cup when said cup is rotated into said unlocked rotational position; and
   said cup being inhibited from actuating the aerosol valve when said cup is rotated into said locked rotational position.

10. A dispensing cup for an aerosol device as set forth in claim 1, wherein said cup is transparent for enabling an operator to view the aerosol product within said cup.

* * * * *